US008165294B2

(12) United States Patent  
Morrow et al.

(10) Patent No.: US 8,165,294 B2
(45) Date of Patent: *Apr. 24, 2012

(54) ROLLBACK ATTACK PREVENTION SYSTEM AND METHOD

(75) Inventors: James W. Morrow, Sparks, NV (US); Marvin A. Hein, Las Vegas, NV (US); David W. Carman, Glenwood, MD (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/019,148

(22) Filed: Feb. 1, 2011

(65) Prior Publication Data

US 2011/0123024 A1 May 26, 2011

Related U.S. Application Data

(63) Continuation of application No. 10/837,209, filed on Apr. 30, 2004, now Pat. No. 7,907,729, which is a continuation-in-part of application No. 10/243,912, filed on Sep. 13, 2002, now abandoned.

(51) Int. Cl.
*H04K 1/00* (2006.01)
*A63F 3/06* (2006.01)
*H04L 9/32* (2006.01)
*G06F 12/14* (2006.01)

(52) U.S. Cl. .......... 380/251; 463/29; 713/168; 713/176; 726/21; 726/28; 726/29

(58) Field of Classification Search .................. None
See application file for complete search history.

(56) References Cited

U.S. PATENT DOCUMENTS

| | | |
|---|---|---|
| 5,599,231 A | 2/1997 | Hibino et al. |
| 5,918,248 A | 6/1999 | Newell et al. |
| 6,149,522 A | 11/2000 | Alcorn et al. |
| 6,430,481 B1 | 8/2002 | Lovelace, II et al. |
| 6,430,738 B1 | 8/2002 | Gross et al. |
| 6,488,585 B1 | 12/2002 | Wells et al. |
| 6,595,856 B1 | 7/2003 | Ginsburg et al. |
| 6,735,768 B1 | 5/2004 | Tanaka |
| 6,908,391 B2 | 6/2005 | Gatto et al. |
| 6,916,247 B2 | 7/2005 | Gatto et al. |
| 6,945,870 B2 | 9/2005 | Gatto et al. |
| 7,107,366 B2 | 9/2006 | Cheng et al. |
| 7,146,498 B1 | 12/2006 | Takechi et al. |
| 7,168,089 B2 | 1/2007 | Nguyen et al. |
| 2002/0002080 A1 | 1/2002 | Stockdale |
| 2002/0116615 A1 | 8/2002 | Nguyen et al. |
| 2003/0100369 A1 | 5/2003 | Gatto et al. |
| 2003/0130032 A1 | 7/2003 | Martinek et al. |
| 2004/0054445 A1 | 3/2004 | Vollmer et al. |
| 2004/0193726 A1 | 9/2004 | Gatto et al. |

(Continued)

FOREIGN PATENT DOCUMENTS

WO    WO0007099 A1    2/2000

(Continued)

*Primary Examiner* — Nasser Goodarzi
*Assistant Examiner* — Fatoumata Traore
(74) *Attorney, Agent, or Firm* — Steptoe & Johnson LLP

(57) ABSTRACT

A rollback attack prevention system 10 for a gaming machine 20 includes a configuration log 30 and a revocation list 40. Preferably, the configuration log 30 includes a protected record of software that has been installed on the gaming machine 20. Further, the revocation list 40 includes an inventory of unauthorized software that the prevention system 10 prevents from being installed and/or used on the gaming machine 20.

38 Claims, 2 Drawing Sheets

U.S. PATENT DOCUMENTS

| | | |
|---|---|---|
| 2004/0198496 A1 | 10/2004 | Gatto et al. |
| 2004/0254013 A1 | 12/2004 | Quraishi et al. |
| 2005/0044401 A1 | 2/2005 | Morrow et al. |
| 2005/0172336 A1 | 8/2005 | Gatto et al. |
| 2005/0209006 A1 | 9/2005 | Gatto et al. |
| 2005/0209007 A1 | 9/2005 | Gatto et al. |
| 2005/0221898 A1 | 10/2005 | Gatto et al. |
| 2005/0223219 A1 | 10/2005 | Gatto et al. |
| 2005/0233811 A1 | 10/2005 | Gatto et al. |
| 2005/0282637 A1 | 12/2005 | Gatto et al. |
| 2006/0100010 A1 | 5/2006 | Gatto et al. |

FOREIGN PATENT DOCUMENTS

| | | |
|---|---|---|
| WO | WO2004004855 A1 | 1/2004 |

ROLLBACK ATTACK PREVENTION SYSTEM AND METHOD

CROSS-REFERENCE TO RELATED APPLICATIONS

This application is a continuation of U.S. patent application Ser. No. 10/837,209, filed Apr. 30, 2004, which is a continuation-in-part of U.S. patent application Ser. No. 10/243,912, filed Sep. 13, 2002, which are both incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This invention relates generally to a software verification system, and more particularly, to a rollback attack prevention system and method that identifies whether changes and updates to software for a gaming machine are authorized. The rollback attack prevention system precludes the installation and use of unauthorized software on a gaming machine

BACKGROUND

Many gaming machines are becoming increasingly complex in the current gaming market. Some of these gaming machines have features and components that enable the play of multiple games on one machine. Accordingly, a wide variety of hardware and/or software is often installed on these multifaceted gaming machines. As the complexity and number of gaming options that are available on a gaming machine increases, it becomes progressively more difficult to monitor and to track the use of these gaming machines, much less to monitor and to track the use of particular applications that are running on each of the gaming machines.

For instance, a gaming machine having several gaming options may have multiple supporting software programs for the games and for the hardware devices necessary to play the games. As the gaming machines are updated or serviced, different versions of the software and different hardware devices are often installed, removed, overwritten, or otherwise rendered obsolete. Accordingly, it is difficult, if not impossible, to continuously monitor and to track all of the current applications running on a specific gaming machine.

The difficulties associated with monitoring and tracking the use of gaming machines can, in some instances, result in an undesirable level of vulnerability to tampering. Unfortunately, players or employees may attempt to develop methods of tampering with the software or hardware already installed on a gaming machine. For example, if a particular software program has been in circulation for a long period of time, multiple versions of the software may have been developed. In this regard, new software versions are sometimes developed (with relatively minor changes), in response to the discovery that earlier versions of the software contained errors that potentially could be exploited to allow tampering. Thus, tampering could occur if someone simply reinstalled the more vulnerable earlier version of the software.

The traditional systems for monitoring and tracking the installation of software on a gaming machine typically rely on identifiers, such as globally unique identifiers, version information, or installation information. Thus, a person wishing to tamper with the software of a gaming machine might change only a few lines of code, or might use a prior version, that although valid at one time, is no longer valid, to circumvent many of the security and authorization systems and methods that are currently in use.

Additionally, the gaming industry is undergoing regulatory changes that may allow the use of a non-volatile storage memory device, such as a hard drive in a gaming machine. The adoption of these various types of non-volatile storage memory will only further compound the problems of assuring that the proper software versions, as well as related hardware, are being installed and used on the gaming machines.

A system and method for monitoring, tracking, and verifying the installation and use of a wide variety of software and hardware is needed. In particular, a system and method is required that can monitor, track, and verify the additions, deletions, changes, and updates that routinely affect gaming machines. A continuing need exists to prevent older versions of software from being used in a gaming machine after a new version has been installed.

Accordingly, there has been a long existing need for a rollback attack prevention system that improves the security of gaming machines by verifying that software is authorized for installation and use. Further, there is a continuing need for a rollback attack prevention system that prevents the installation and use of unauthorized software. Accordingly, those skilled in the art have long recognized the need for a rollback attack prevention system and method that addresses these and other issues.

SUMMARY

Briefly, and in general terms, a preferred embodiment resolves the above and other issues by providing a system and method for a rollback attack prevention system that controls installation and use of software on a gaming machine. The system includes a non-volatile memory device associated with and local to the gaming machine, wherein the memory device contains a configuration log, and wherein the configuration log includes a record of software changes that had been made on the gaming machine. Additionally, the system also includes a revocation list stored in the memory device, wherein the revocation list includes an inventory of unauthorized software that the prevention system blocks from being installed or used on the gaming machine, and wherein the inventory includes at least software that has been superseded. The inventory is updateable after each change to the software on the gaming machine. In this regard, authorization for any such updates is verified using message authentication code and digital signature verification. Preferably, the authorization for the updates is verified in conjunction with the use of bKey electronic identifiers.

In accordance with an aspect of some embodiments, the configuration log and the revocation list are stored on a remote memory storage device that is not part of the system. Preferably, the non-volatile, memory storage device is protected. In one embodiment, the memory storage device is protected by digital signature verification using DSA (Digital Signature Algorithm) or RSA (Rivest-Shamir-Adleman) encryption technology. In this regard, the configuration log and the revocation list are preferably protected using digital signature verification so that any unauthorized changes are easily identifiable. Of course, other suitable protection techniques may also be used in other embodiments.

Still further, one preferred embodiment utilizes a Message Authentication Code (MAC), which may be used to verify both the data integrity and the authenticity of a message. A Message Authentication Code can be generated faster than using digital signature verification technology, although it is not as robust. In one preferred embodiment, the authentication technique utilized is a bKey (electronic key) device. A bKey is an electronic identifier that is tied to a particular individual.

In accordance with another aspect of an embodiment, the configuration log is updated for each alteration of its software on the gaming machine. Thus, the configuration log preferably reflects every change in the record regarding the software that has been previously installed on the gaming machine. Additionally, the revocation list preferably is updated in response to software installation on the gaming machine so that the software running just prior to the new installation is now added to the revocation list. The revocation list is used to verify that new software is authorized for installation on the gaming machine. The installation and/or use of the new software is not permitted if the new software is listed on the revocation list. Conversely, installation and/or use of the new software is permitted if the new software is not listed on the revocation list.

Additionally, in one embodiment, the revocation list is used to verify that existing software on the gaming machine is authorized for continued use on the gaming machine. In this regard, existing software that is on the revocation list is disabled on the gaming machine, and existing software that is not on the revocation list continues to be enabled for use on the gaming machine. Preferably, disablement of existing software includes un-installing the software on the gaming machine.

In accordance with another aspect of some embodiments, the rollback attack prevention system further includes an installation medium drive (CD drive, DVD drive, or other device) for loading software onto the gaming machine. Preferably, a CD or DVD drive is used as the installation medium drive, and the software that is loaded onto the gaming machine is accessed from a CD or DVD (i.e., the installation medium). The drive can be either an external drive or an internal drive. Preferably, the CD or DVD includes an updated revocation list. In some embodiments, an updated configuration log is also included, which is useful for situations such as when the configuration log has been corrupted or otherwise needs to be replaced.

In accordance with another embodiment, a preferred method for preventing the unauthorized installation and/or use of software on a gaming machine utilizes a rollback attack prevention system. The method preferably includes: establishing a configuration log and loading a revocation list into a non-volatile memory storage device associated with the gaming machine, wherein the configuration log includes a record of software that is currently installed on the gaming machine and software that had been previously installed on the gaming machine; using the revocation list to determine whether to disable or to permit continued use of existing software; in response to an attempt to load new software onto the gaming machine, using the revocation list to determine whether installation of the new software is permitted; updating the configuration log as required; and updating the revocation list as required, wherein the revocation list is updateable after each change to the software on the gaming machine, wherein authorization for any such updates is verified using message authentication code and digital signature verification, and wherein the authorization for the updates is verified in conjunction with the use of bKey electronic identifiers.

In accordance with another aspect, the establishing of an initial configuration log and the loading of an initial revocation list into a memory storage device further includes: storing an initial configuration log, wherein the configuration log includes a protected record of the software that has previously been installed on the gaming machine; and loading an initial revocation list, wherein the revocation list indicates software that is not authorized for installation and/or use on the gaming machine.

In yet another embodiment, updating the revocation list comprises downloading a revocation list update, wherein the revocation list update includes information regarding software authorization criteria for installation and/or use on the gaming machine; and saving the updated revocation list to a memory storage device. Another aspect of one method additionally includes checking an updated revocation list for any new software to determine whether the new software is authorized for installation and/or use on the gaming machine.

In accordance with still another aspect, the method further includes: checking an updated revocation list for existing software to determine whether continued use of the existing software on the gaming machine is authorized. Preferably, the existing software is disabled if the existing software is listed on the updated revocation list. Additionally, in a preferred method the disabling of the existing software includes uninstalling the existing software from the gaming machine. Preferably, continued use of the existing software is authorized if the existing software is not found on the updated revocation list. Furthermore, a preferred method for updating the configuration log comprises: saving data regarding at least the installation of new software on the gaming machine; and saving data regarding the disabling, if any, of any existing software found on the gaming machine.

Other features and advantages of the described embodiments will become apparent from the following detailed description, taken in conjunction with the accompanying drawings, which illustrate by way of example, the features of the described embodiments.

DETAILED DESCRIPTION OF THE PREFERRED EMBODIMENTS

A preferred embodiment of the rollback attack prevention system verifies whether software is authorized for installation and/or use on a gaming machine. A preferred embodiment of the rollback attack prevention system precludes the installation and/or use of unauthorized software on a gaming machine. The term "software" as used herein describes both typical software programs, including system and application software, and the installation and use of hardware requiring software-based applications for use. The term software may also include firmware. Furthermore, the phrase "gaming machine" as used herein describes typical gaming machines as well as other gaming related, computing systems, such as game servers and the like.

Figure 1:
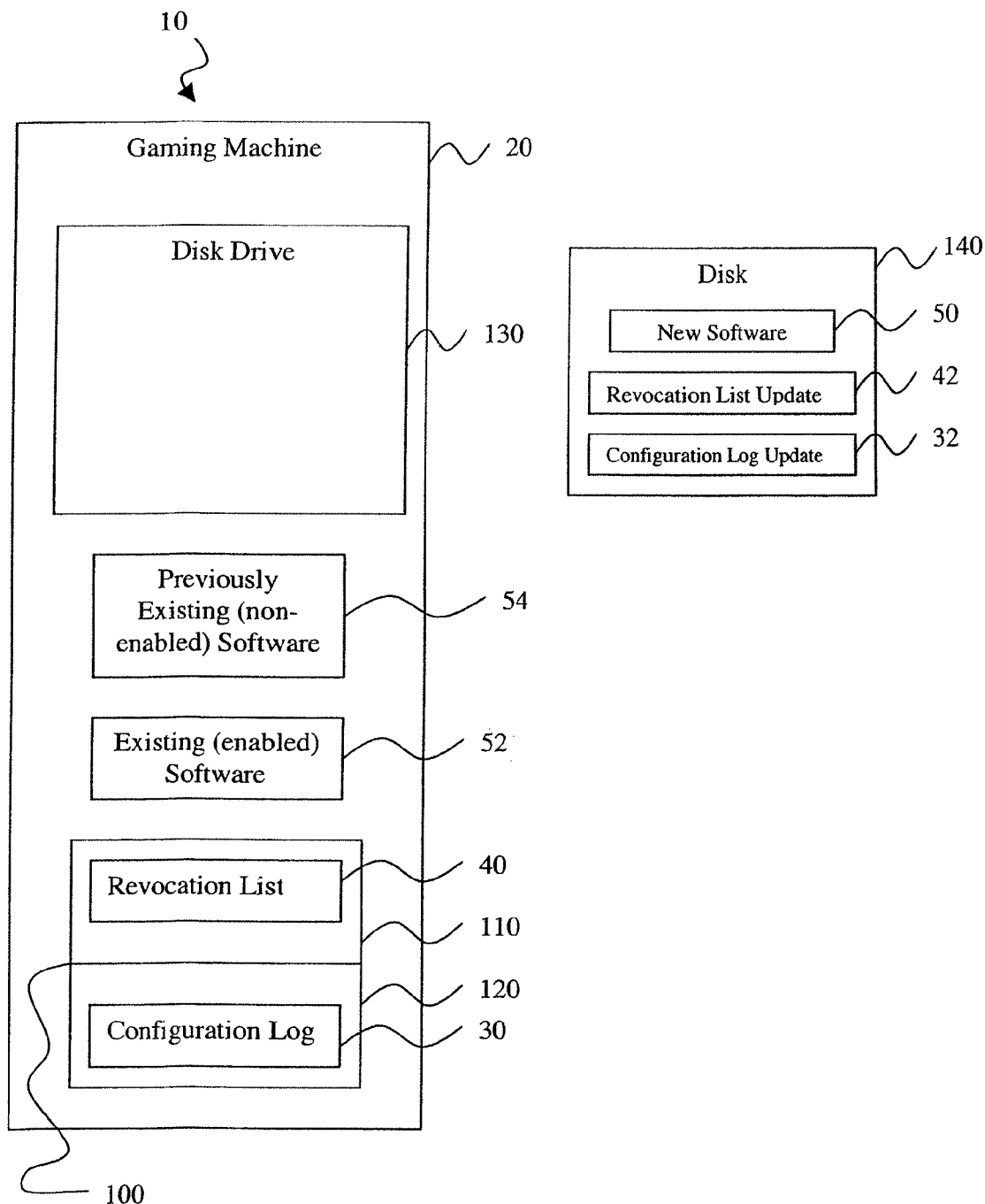
FIG. 1 illustrates a rollback attack prevention system having a configuration log and a revocation list stored on a memory device, wherein the system interacts with various pieces of software.
Figure 2:
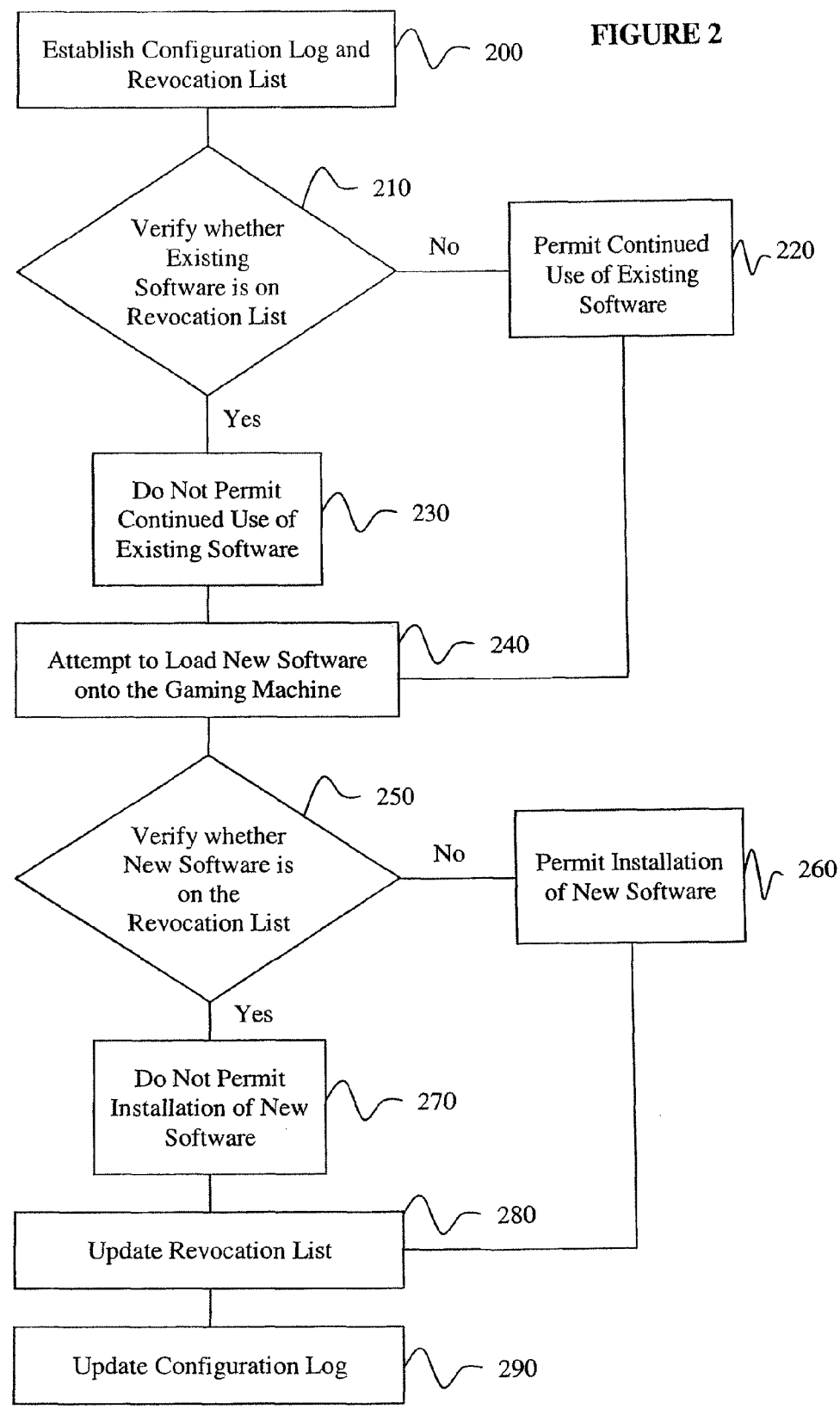
FIG. 2 illustrates a method for loading software onto a gaming machine that is utilizing a rollback attack prevention system.

Referring now to the drawings, wherein like reference numerals denote like or corresponding parts throughout the drawings, and more particularly to FIGS. 1-2, there is shown a preferred rollback attack prevention system. Specifically, FIG. 1 shows a preferred embodiment of a rollback attack prevention system 10 for a gaming machine 20 that includes a configuration log 30 and a revocation list 40. Preferably, the configuration log 30 includes a protected record of software that previously has been installed on the gaming machine 20. In one preferred embodiment, even though the configuration log 30 is protected, the configuration log may still be supplemented by authorized personnel. Preferably, authorization is verified using digital signature verification. Further, in a preferred embodiment the revocation list 40 includes an inventory of unauthorized software that the prevention system 10 blocks from being installed and/or used on the gaming machine.

As stated above, the configuration log 30 is a protected log comprising software changes that have been made to the gaming machine 20. In a preferred embodiment, the configuration log 30 is updated each time new software 50 is added to the gaming machine 20 and each time that existing software 52 is disabled or uninstalled on the gaming machine. The configuration log 30 contains a log of all software currently or previously installed (or previously attempted to be installed), on the gaming machine 20. Therefore, data regarding previously existing software 54 that is no longer enabled (or no longer installed) on the gaming machine 20 is contained in the configuration log 30.

As stated above, in a preferred embodiment of the rollback attack prevention system 10, the system includes a revocation list 40. The revocation list 40 is preferably stored in a memory storage device 100 that is associated with the gaming machine 20. Such a memory storage device may include, by way of example only, and not by way of limitation, a hard drive or other long term, non-volatile memory storage device. The revocation list 40 includes a listing of software that is not authorized for installation and/or use on the gaming machine 20. Typically, in one preferred embodiment of the rollback attack prevention system 10, the revocation list 40 prevents any existing software 52 or previously existing software 54 (i.e., software that was previously loaded but was later either disabled or removed) from being reloaded after new software 50 supersedes it. Accordingly, in such an embodiment, whenever software is added, disabled, or deleted from the gaming machine 20, the revocation list 40 is updated to reflect such changes to the list of software that is authorized for installation and/or use on the gaming machine 20 (e.g., so that the software running just prior to the new installation is now added to the revocation list).

Using the revocation list 40, the rollback attack prevention system 10 verifies whether new software 50 is authorized for installation and whether existing software 52 is authorized for continued use on the gaming machine 20. If the software 50 or 52 to be verified is not on the revocation list 40, new software 50 may be installed and/or existing software 52 may continue to be used. However, if the software 50 or 52 is on the revocation list 40, the new software 50 is not installed and/or existing software 52 is disabled. Importantly, in one possible rollback attack scenario, the new software 50 to be installed on the gaming machine 20 was previously installed on that gaming machine. Thus, in such a situation the new software 50 could also be defined as previously existing software 54. In such a situation, the software could have been authorized when it was previously existing software 54, but be unauthorized now that it is new software 50, due to the revocation list 40 having been updated to now include this software in the interim.

In one exemplary embodiment, when a user attempts to load new software 50, the system 10 checks whether the new software is listed on the revocation list 40. If the new software 50 is not on the list 40, installation of the new software on the gaming machine 20 is permitted. Conversely, in a preferred embodiment of the rollback attack prevention system 10, if the new software 50 is listed on the revocation list 40, installation of the new software 50 is not permitted. Further, the system 10 also checks whether existing software 52 is listed on the revocation list 40. If the existing software 52 is on the revocation list 40, it is disabled from further use on the gaming machine 20. However, if the existing software 52 is not found on the revocation list 40, no change is made to the existing software 52, and it may continue to be used on the gaming machine 20 contemporaneously with (or instead of) the new software 50.

Typically, with each attempt to load (or install) new software 50, a preferred embodiment rollback attack prevention system 10 updates the revocation list 40, and checks all existing software 52 on the gaming machine 20. In one embodiment, the existing software 52 is determined by scanning the configuration log 30. The existing software 52 that is shown to be installed may also be determined by scanning the memory storage device 100 that is associated with the gaming machine 20. In other preferred embodiments, various other updating techniques may be used including, by way of example only, and not by way of limitation, a network via a data download, electronic keys, smart cards, memory sticks, memory cards, portable drives, and the like.

In one possible scenario using the rollback attack prevention system 10, when new software 50 is installed on the gaming machine 20, and the revocation list 40 indicates that existing software 52 is not authorized for use with the new software 50, the existing software 52 is disabled. In one embodiment, such disabling of existing software 52 includes uninstalling the existing software 52. Further, in one preferred embodiment, the revocation list 40 may indicate that more than one version of software is approved for installation or use on a gaming machine 20 at the same time. For example, if new software 50 is installed, the revocation list 40 may indicate that existing software 52 may also remain installed and enabled for use on the gaming machine 20, and that a previously existing software 54 is not authorized for use and is disabled if present.

In a preferred embodiment, the rollback attack prevention system 10 also includes a memory storage device 100. In one preferred embodiment, the configuration log and the revocation list are stored on a local memory storage device that is part of the system. In another preferred embodiment, the configuration log and the revocation list are stored on a remote memory storage device that is not part of the system. Preferably, the non-volatile, memory storage device is protected.

In one embodiment, the memory storage device is protected by digital signature verification using DSA (Digital Signature Algorithm) or RSA (Rivest-Shamir-Adleman) encryption technology. In this regard, the configuration log and the revocation list are preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that is was indeed created by the specified entity). In another embodiment, the memory storage device 100 is protected using other suitable technology.

One preferred embodiment utilizes a Message Authentication Code (MAC). A Message Authentication Code is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A Message Authentication Code is attached to data in order to allow data authentication. Further, a MAC may be used to simultaneously verify both the data integrity and the authenticity of a message. Typically, a Message Authentication Code (MAC) is a one-way hash function that takes as input both a symmetric key and some data. A symmetric-key algorithm is an algorithm for cryptography that uses the same cryptographic key to encrypt and decrypt the message.

A Message Authentication Code can be generated faster than using digital signature verification technology; however, a Message Authentication Code is not as robust as digital signature verification technology. Thus, when speed of processing is critical the use of a Message Authentication Code provides an advantage because it can be created and stored more rapidly than digital signature verification technology.

In one preferred embodiment, the authentication technique utilized is a bKey (electronic key) device. A bKey is an electronic identifier that is tied to a particular individual. In this manner, any accessing and modification of data that is made using a bKey for authentication is linked to the specific individual to which that bKey is tied. Accordingly, an audit trail is thereby established for regulators and/or other entities that require this kind of data or system authentication.

Additionally, the rollback attack prevention system 10 preferably further includes an installation medium drive 130, such as a CD-ROM/DVD drive, that associates with an installation medium 140, such as CD-ROM or DVD. The memory storage device 100 is preferably a long term, non-volatile memory storage device. In one preferred embodiment of the rollback attack prevention system 10, the memory storage device 100 is a hard drive.

Referring again to FIG. 1, an installation medium drive 130 and installation medium 140 are shown for loading software on the gaming machine 20. Although it is preferable to use an installation medium drive 130 and installation medium 140 for loading software, other data transfer mediums and associated hardware devices may be used in other preferred embodiments. These include, by way of example only, and not by way of limitation, networks, electronic keys, smart cards, memory sticks, memory cards, portable drives, and the like. In one preferred embodiment, the installation medium drive 130 is an external drive; however, in another preferred embodiment the installation medium drive 130 is configured in the system 10 as an internal drive.

In a preferred embodiment, the installation medium drive 130 is a CD-ROM drive or DVD drive, and the installation medium 140 is a CD-ROM (or DVD). The installation medium 140 contains new software 50 and a revocation list update 42. The revocation list update 42 is used to update the revocation list 40 with information regarding software that is not authorized for installation and use on the gaming machine 20. In one embodiment, the installation medium 140 also includes a configuration log update 32 that can be used to update the configuration log 30 stored in the memory 100 of the gaming device 20 (which is useful for situations such as when the configuration log has been corrupted or otherwise needs to be replaced).

In another embodiment, a preferred method for using the rollback attack prevention system 10 verifies that existing software 52 is authorized for use, as well as precluding the installation (and use) of unauthorized new software 50 on a gaming machine 20. A preferred method includes: establishing a configuration log and loading a revocation list into a memory storage device associated with the gaming machine; using the revocation list to determine whether to disable or to permit continued use of existing software; using the revocation list to determine whether installation of the new software is permitted in response to an attempt to load the new software on the gaming machine; updating the revocation list as required; and updating the configuration log as required.

In this regard, FIG. 2 illustrates a method of verifying whether new software 50 is authorized for installation on a gaming machine 20. In a preferred method, before new software 50 is installed, the rollback attack prevention system 10 is in an initial state. In this initial state, the initial configuration log 30 and an initial revocation list 40 are stored in the memory storage device 100. As described above, the configuration log 30 is a protected log of software initially installed on the gaming machine 20. The configuration log 30 is preferably protected using digital signature verification so that any unauthorized changes would be easily identifiable. Again, the revocation list 40 indicates software that is not authorized for installation and use on the gaming machine 20, and is preferably also protected using digital signature verification. At Step 200, the initial configuration log 30 and initial revocation list 40 are established.

At Step 210, the system uses the revocation list 40 to verify whether the existing software 52 on the gaming machine 20 is authorized for continued use. This is accomplished by checking the revocation list 40. If the existing software 52 is not listed on the revocation list 40, then continued use of the existing software 52 is permitted, as shown at Step 220. However, if the existing software 52 is found on the revocation list 40, then continued use of the existing software is not permitted, as shown at Step 230.

At Step 240, a user attempts to load new software 50 on the gaming machine 20. In one preferred embodiment, this attempt to load new software 50 onto the gaming machine 20 is performed using a installation medium drive 130 and an associated installation medium 140 that contains the new software, as shown in FIG. 1. In this embodiment, the installation medium 140 also contains a revocation list update 42. The revocation list update 42 includes information regarding which software is authorized for installation and use on the gaming machine 20. The revocation list 40 is updated by downloading the revocation list update 42 from the installation medium 140, and saving the updated revocation list to the memory storage device 100. As described above, in one embodiment the installation medium 140 also includes a configuration log update 32 that can be used to update the configuration log 30 stored in the memory 100 of the gaming device 20 (which is useful for situations such as when the configuration log has been corrupted or otherwise needs to be replaced).

Referring again to FIG. 2, at Step 250 the system verifies whether new software 50 is authorized for installation on the gaming machine 20 using the revocation list 40. This is accomplished by checking the revocation list 40. If the new software 50 is not on the revocation list 40, installation of the new software 50 is permitted, as shown at Step 260. However, if the new software 50 is on the revocation list 40, installation of the new software is not permitted, as shown at Step 270.

Thus, the new software 50 is either installed at Step 260 if the new software 50 is not on the revocation list 40, or not installed at Step 270 if the new software 50 is on the revocation list 40. Next, at Step 280, the system updates the revocation list 40, as required. In some embodiments the revocation list 40 is updated using a revocation list update 42 that is downloaded from the installation medium 140, as described above. Additionally, in some embodiments, the revocation list 40 is updated earlier in the process, such as before the new software 50 is attempted to be loaded at Step 240. Finally, at Step 290, the system updates the configuration log 30. The configuration log 30 reflects the installation of new software 50 (assuming that it was not on the revocation list). Thus, the updated configuration log 30 includes a complete log of all software on the gaming machine 20.

In a preferred method, the rollback attack prevention system 10 is used to verify that software is authorized for installation and/or use (and to preclude the installation and use of unauthorized software) on a gaming machine 20. In one such preferred method, the new software 50 is added to a gaming machine in addition to the existing software 52 already installed thereon. In this preferred method, the system 10 already has a configuration log 30 and revocation list 40 stored on the memory storage device 100. Preferably, the most recently updated configuration log 30 and the most recently updated revocation list 40 are utilized.

Although the gaming machine already has existing software 52 installed, a user may wish to install new software 50 to be used contemporaneously with the existing software. In such a situation, the user attempts to load the new software 50 onto the gaming machine 20. In a preferred embodiment, an installation medium drive 130 and an associated installation medium 140 are used to attempt to load the new software 50 onto the gaming machine. Preferably, the installation medium 140 contains the new software 50 and a revocation list update 42. As previously discussed, the revocation list update 42 includes information designating which software is authorized for installation and/or use on the gaming machine 20. Additionally, as discussed in detail above, a configuration log update 32 is also included in some situations. A configuration log update 32 can be used to update the configuration log 30 stored in the memory 100 of the gaming device 20. This is useful in certain situations, such as when the configuration log has been damaged, corrupted, or otherwise needs to be replaced. The configuration log update 32 includes information cataloging the existing software 52 and the new software 50.

In one preferred embodiment, the rollback attack prevention system 10 updates the revocation list 40 by downloading the revocation list update 42 from the installation medium 140. The updated revocation list 40 is then saved to the memory storage device 100. Using the updated revocation list 40, the system 10 verifies whether installation of the new software 50 is authorized and whether continued use of the existing software 52 is authorized. The system 10 performs this verification by checking the updated revocation list 40. Preferably, the revocation list 40 and the configuration log 30 are protected using digital signature verification so that any unauthorized changes are easily identifiable. The digital signature verification technology is preferably DSA (Digital Signature Algorithm) or RSA (Rivest-Shamir-Adleman) encryption technology. The ability for more than one piece of software to be authorized for installation on a gaming machine 20 at the same time provides numerous options for installing, disabling, and continuing use of software on the gaming machine.

In one scenario utilizing a preferred embodiment system 10, the existing software 52 is on the revocation list, but the new software 50 is not on the revocation list 40. In response, the existing software 52 is disabled and the installation of the new software 50 proceeds. In another scenario utilizing a preferred embodiment system 10, the existing software 52 is not on the revocation list, but the new software 50 is on the revocation list 40. In response, continued use of the existing software 52 is permitted and the installation of new software 50 is not permitted. In still another scenario utilizing a preferred embodiment system 10, neither the existing software 52 nor the new software 50 are on the revocation list 40. In response, no change is made to the existing software 52 and the new software 50 is installed. In yet another scenario utilizing a preferred embodiment system 10, both the existing software 52 and the new software 50 are on the revocation list 40. In response to this scenario, the existing software 52 is disabled and installation of the new software 50 is not permitted.

Notably, regardless of whether the existing software 52 remains unchanged or is disabled, and regardless of whether the new software 50 is installed or not permitted to be installed, the system 10 preferably always updates the configuration log 30. Thus, the configuration log 30 includes a complete log of all software on the gaming machine. In yet another preferred embodiment, the configuration log 30 may also be updated using the configuration log update 32 from the installation medium 140, which is useful in certain situations, such as when the configuration log has been damaged, corrupted, or otherwise needs to be replaced.

Furthermore, the various methodologies described above are provided by way of illustration only and should not be construed to limit the described embodiments. Those skilled in the art will readily recognize that various modifications and changes may be made to the described embodiments of the present application without departing from the true spirit and scope of the described embodiments. Accordingly, it is not intended that the described embodiments be limited, except as by the appended claims.

What is claimed:

1. A rollback attack prevention system that controls installation and use of software on a gaming machine, the system comprising:
    a non-volatile memory device associated with and local to the gaming machine, wherein the memory device contains a configuration log, wherein the configuration log includes a record of software changes that had been made on the gaming machine; and
    a revocation list stored in the memory device, wherein the revocation list includes an inventory of unauthorized software that the prevention system blocks from being installed or used on the gaming machine, wherein the inventory includes at least software that has been superseded, wherein the inventory is updateable after each change to the software on the gaming machine, and wherein authorization for any such updates is verified using message authentication code and digital signature verification;
    wherein the authorization for the updates is verified in conjunction with the use of bKey electronic identifiers.

2. The system of claim 1, wherein the configuration log is protected using digital signature verification so that any unauthorized changes are easily identifiable.

3. The system of claim 1, wherein the configuration log is protected using message authentication code so that any unauthorized changes are easily identifiable.

4. The system of claim 1, wherein the revocation list is protected using digital signature verification so that any unauthorized changes are easily identifiable.

5. The system of claim 1, wherein the revocation list being protected using message authentication code so that any unauthorized changes are easily identifiable.

6. The system of claim 1, wherein the non-volatile memory storage device is protected using digital signature verification, and wherein the digital signature verification is DSA encryption.

7. The system of claim 1, wherein the non-volatile memory storage device is protected using digital signature verification, and wherein the digital signature verification is RSA encryption.

8. The system of claim 1, wherein the configuration log is updated by the system in response to an attempted or actual software installation on the gaming machine.

9. The system of claim 1, wherein the revocation list is used to verify that new software is authorized for installation on the gaming machine, wherein installation and use of new software is not permitted if the new software is found on the revocation list, and wherein installation and use of new software is permitted, if the new software is not found on the revocation list.

10. The system of claim 9, wherein the revocation list is used to verify that existing software on the gaming machine is authorized for continued use on the gaming machine, wherein existing software that is listed on the revocation list is disabled for use on the gaming machine, and wherein existing software that is not on the revocation list continues to be enabled for use on the gaming machine.

11. The system of claim 10, wherein disabling of existing software includes uninstalling the software on the gaming machine.

12. The system of claim 1, further comprising an installation medium drive for loading software on the gaming machine from an installation medium.

13. The system of claim 12, wherein the installation medium drive is a CD-ROM/DVD-ROM drive, and wherein the installation medium from which the loadable software is accessed is a CD-ROM/DVD-ROM.

14. The system of claim 12, wherein the installation medium drive is an external drive.

15. The system of claim 12, wherein the installation medium drive is an internal drive.

16. The system of claim 12, wherein the installation medium drive is selected from the group consisting of networks, electronic keys, smart cards, memory sticks, memory cards, portable mini-drives.

17. The system of claim 12, wherein the installation medium includes an updated revocation list.

18. The system of claim 12, wherein the installation medium includes updates for the configuration log.

19. A method for preventing unauthorized installation and use of software on a gaming machine using a rollback attack prevention system, comprising:

establishing a configuration log and loading a revocation list into a non-volatile memory storage device associated with the gaming machine, wherein the configuration log includes a record of software that is currently installed on the gaming machine and software that had been previously installed on the gaming machine;

using the revocation list to determine whether to disable or to permit continued use of existing software;

in response to an attempt to load new software onto the gaming machine, using the revocation list to determine whether installation of the new software is permitted;

updating the configuration log as required; and updating the revocation list as required, wherein the revocation list is updateable after each change to the software on the gaming machine, wherein authorization for any such updates is verified using message authentication code and digital signature verification, and wherein the authorization for the updates is verified in conjunction with the use of bKey electronic identifiers.

20. The method of claim 19, wherein establishing a configuration log and loading a revocation list into a memory storage device comprises:

storing a configuration log, wherein the configuration log includes a protected record of software that had been installed on the gaming machine; and loading a revocation list, wherein the revocation list indicates software that is unauthorized for installation and use on the gaming machine.

21. The method of claim 20, wherein installation of the new software is permitted if the new software is not on the updated revocation list.

22. The method of claim 19, wherein establishing a configuration log comprises scanning the configuration history of the gaming machine, and wherein loading an initial revocation list comprises loading a revocation list from an installation medium onto the memory storage device associated with the gaming machine.

23. The method of claim 19, wherein the non-volatile memory storage device is protected using digital signature verification, and wherein the digital signature verification is DSA encryption.

24. The method of claim 19, wherein the non-volatile memory storage device is protected using digital signature verification, and wherein the digital signature verification is RSA encryption.

25. The method of claim 19, wherein the non-volatile memory storage device is protected using digital signature verification so that any unauthorized changes are easily identifiable.

26. The method of claim 19, wherein the non-volatile memory storage device is protected using message authentication code so that any unauthorized changes are easily identifiable.

27. The method of claim 19, wherein the configuration log is updated by the system in response to an attempted or actual software installation on the gaming machine.

28. The method of claim 19, wherein an installation medium drive and an installation medium containing the new software are used to attempt to load new software on the gaming machine.

29. The method of claim 28, wherein the installation medium drive is a CD-ROM/DVD-ROM drive, and wherein the installation medium from which the loadable new software is accessed is a CD-ROM/DVD-ROM 30. The method of claim 19, wherein updating the revocation list comprises:

downloading a revocation list update, wherein the revocation list update includes information regarding software authorization criteria for installation and use on the gaming machine; and saving the updated revocation list to the memory storage device.

31. The method of claim 19, further comprising:
checking an updated revocation list for new software to determine whether new software is authorized for installation and use on the gaming machine.

32. The method of claim 19, wherein installation of the new software is not permitted if the new software is on the updated revocation list.

33. The method of claim 19, further comprising:
checking an updated revocation list for existing software to determine whether continued use of existing software on the gaming machine is authorized.

34. The method of claim 33, wherein the existing software is disabled if the existing software is on the updated revocation list.

35. The method of claim 34, wherein the disabling of the existing software includes uninstalling the existing software from the gaming machine.

36. The method of claim 33, wherein continued use of the existing software is authorized if the existing software is not on the updated revocation list.

37. The method of claim 19, wherein updating the configuration log comprises:
saving data regarding at least the installation of new software on the gaming machine; and
saving data regarding disablement, if any, of existing software on the gaming machine.

38. A rollback attack prevention system that controls installation and use of software on a gaming machine, the system comprising:
a memory storage device associated with and local to the gaming machine;
a configuration log stored in the memory storage device, wherein the configuration log includes a record of software that is currently installed on the gaming machines, had been previously installed on the gaming machines, and was attempted to be installed on the gaming machine; and
a revocation list stored in the memory storage device, wherein the revocation list includes an inventory listing of unauthorized software that the prevention system prevents from being installed or used on the gaming machine, wherein the inventory includes at least software that has been superseded, wherein the revocation list is updateable after each change to the software on the gaming machine, and wherein authorization for any such updates is verified using message authentication code and digital signature verification;
wherein the authorization for these updates is verified in conjunction with the use of bKey electronic identifiers.

* * * * *